US012656182B2

(12) United States Patent   (10) Patent No.:  US 12,656,182 B2
Dockter et al.   (45) Date of Patent:    Jun. 16, 2026

(54) SYSTEMS AND METHODS FOR WIRELESS TEMPERATURE MONITORING OF AN IMPLEMENT

(71) Applicant: Vermeer Manufacturing Company, Pella, IA (US)

(72) Inventors: Nathan Dockter, Pella, IA (US); Ryan Konen, Lenexa, KS (US); Stephen D. Ore, Olathe, KS (US)

(73) Assignee: Vermeer Manufacturing Company, Pella, IA (US)

( * ) Notice: Subject to any disclaimer, the term of this patent is extended or adjusted under 35 U.S.C. 154(b) by 376 days.

(21) Appl. No.: 18/572,104

(22) PCT Filed: Jun. 20, 2022

(86) PCT No.: PCT/US2022/034171
§ 371 (c)(1),
(2) Date: Dec. 19, 2023

(87) PCT Pub. No.: WO2022/271593
PCT Pub. Date: Dec. 29, 2022

(65) Prior Publication Data
US 2024/0288314 A1    Aug. 29, 2024

Related U.S. Application Data

(60) Provisional application No. 63/215,068, filed on Jun. 25, 2021.

(51) Int. Cl.
*G01K 1/024*    (2021.01)
*G01K 3/00*    (2006.01)
*G01K 7/22*    (2006.01)

(52) U.S. Cl.
CPC ............. *G01K 1/024* (2013.01); *G01K 3/005* (2013.01); *G01K 7/22* (2013.01); *G01K 2215/00* (2013.01)

(58) Field of Classification Search
CPC .......... G01K 1/024; G01K 3/005; G01K 7/22; G01K 2215/00
See application file for complete search history.

(56) References Cited

U.S. PATENT DOCUMENTS

| | | | |
|---|---|---|---|
| 2,745,285 A | 5/1956 | Wannamaker, Jr. | |
| 2,929,968 A | 3/1960 | Henisch | |

(Continued)

FOREIGN PATENT DOCUMENTS

| | | |
|---|---|---|
| KR | 101898098 B1 | 4/2019 |
| WO | 2016135642 A2 | 4/2019 |

(Continued)

OTHER PUBLICATIONS

International Search Report and Written Opinion in PCT/US2022/034171, mailed Oct. 14, 2022, 11 pages.

(Continued)

*Primary Examiner* — Randy W Gibson
(74) *Attorney, Agent, or Firm* — Armstrong Teasdale LLP

(57) ABSTRACT

A temperature monitoring system for monitoring bearing temperatures on a machine is provided. The temperature monitoring system includes a temperature sensing device, a cable assembly, and a sensor assembly including a sensor connector and a microcontroller unit (MCU). The sensor connector is electrically coupled to the MCU and is configured to engage the cable assembly. The MCU is configured to determine a temperature based on an electrical parameter of the temperature sensing device and generate temperature data representing the determined temperature. The MCU is further configured to transmit the temperature data to a sensor hub configured to transfer the temperature data to a display of a user interface. Engaging the cable assembly with the sensor connector causes the MCU to be electrically coupled to a battery, and disengaging the cable assembly (Continued)

from the sensor connector causes the MCU to be electrically decoupled from the battery.

20 Claims, 6 Drawing Sheets

(56) References Cited

U.S. PATENT DOCUMENTS

| 4,700,436 | A | 10/1987 | Morita |
| 4,812,826 | A | 3/1989 | Kaufman |
| 4,842,419 | A | 6/1989 | Nietert |
| 5,043,690 | A | 8/1991 | Wahls |
| 5,200,736 | A | 4/1993 | Coombs et al. |
| 5,697,552 | A | 12/1997 | McHugh et al. |
| 5,875,085 | A | 2/1999 | Farley |
| 6,301,514 | B1 | 10/2001 | Canada et al. |
| 6,836,205 | B2 | 12/2004 | Scott et al. |
| 6,926,445 | B2 | 8/2005 | Sato et al. |
| 7,034,711 | B2 | 4/2006 | Sakatani et al. |
| 7,039,491 | B1 | 5/2006 | Delbrugge, Jr. et al. |
| 7,358,740 | B2 | 4/2008 | Davis et al. |
| 9,284,987 | B2 | 3/2016 | Murphy |
| 9,291,203 | B2 | 3/2016 | Lewis |
| 9,939,165 | B2 | 4/2018 | Oh et al. |
| 10,528,067 | B2 * | 1/2020 | Chan ........................ G01K 7/25 |
| 2002/0038192 | A1 | 3/2002 | Klaar |
| 2002/0060622 | A1 | 5/2002 | Scott et al. |
| 2006/0208846 | A1 | 9/2006 | Davis et al. |
| 2011/0084685 | A1 | 4/2011 | Zhong et al. |
| 2011/0137587 | A1 | 6/2011 | Rothlisberger |
| 2012/0185186 | A1 | 7/2012 | Banerjee et al. |
| 2012/0212210 | A1 | 8/2012 | Takeda |
| 2014/0266741 | A1 | 9/2014 | Lewis |
| 2015/0168268 | A1 | 6/2015 | Fish et al. |
| 2015/0345818 | A1 | 12/2015 | Oh et al. |
| 2017/0033576 | A1 | 2/2017 | Qu |
| 2017/0179713 | A1 | 6/2017 | Bourns et al. |
| 2019/0101452 | A1 | 4/2019 | Bass |

FOREIGN PATENT DOCUMENTS

| WO | 2019169457 | A1 | 9/2019 |
| WO | 2020206372 | A | 10/2020 |

OTHER PUBLICATIONS

"Predictive Maintenance System Temperature Monitoring", RF Micron, http://rfmicron.com/wp-content/uploads/2016/06/1p-PB012F10-RFM5104-A-Predictive-Maintenance-Temperature-Monitoring-System-Brochure-720px.png, 2016.
"ABB Ability Smart Sensor for mounted bearings", ABB Motors and Mechanical Inc., https://new.abb.com/mechanical-power-transmission/smart-sensor-for-mechanical-products, 2018.

* cited by examiner

600

| | |
|---|---|
| Ambient | 77° F |
| Sensor 1 | 77° F |
| Sensor 2 | 75.2° F |
| Sensor 3 | 75.2° F |
| Sensor 4 | 77° F |

SYSTEMS AND METHODS FOR WIRELESS TEMPERATURE MONITORING OF AN IMPLEMENT

CROSS-REFERENCE TO RELATED APPLICATIONS

This patent application is the 35 U.S.C. § 371 national stage of International Patent Application No. PCT/US2022/034171, filed Jun. 20, 2022, which claims priority to U.S. Provisional Patent Application No. 63/215,068, filed Jun. 25, 2021. Both applications are hereby incorporated by reference herein in their entirety.

FIELD OF THE DISCLOSURE

The field of the disclosure relates to temperature monitoring systems, and more particularly, to wireless temperature monitoring systems for agricultural implements and other machines.

BACKGROUND

Agricultural implements, such as balers and other machines include mechanical components that rotate during operation. Such components are generally coupled to the remainder of the machine by supporting bearings, which reduce friction during component rotation and as a result minimize heat and deterioration caused by the friction. When a bearing fails, damage to the machine may result, necessitating potentially costly repairs and downtime during which the machine is inoperable. In at least some machines, temperature monitoring systems are used to measure bearing temperature during operation of the machine. Because elevated bearing temperatures may indicate that a bearing is failing, monitoring the bearing temperatures enables the machine owner or operator to take preventative measures, such as replacing the bearing, before a major failure occurs.

Temperature monitoring systems may include a plurality of sensors dispersed throughout the machine, for example, proximate different bearings. Such sensors generally require a power source to operate, such as a connection to an external power source or an internal battery. However, connections to an external power source require potentially cumbersome wiring, and internal batteries may deplete quickly with frequent use of the sensor, requiring frequent replacement. A temperature monitoring system having reduced power consumption is therefore desirable.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a temperature monitoring system for monitoring bearing temperatures on a machine is provided. The temperature monitoring system includes a temperature sensing device having an electrical parameter that varies with temperature. The temperature monitoring system further includes a cable assembly electrically coupled to the temperature sensing device. The temperature monitoring system further includes a sensor assembly including a sensor connector and a microcontroller unit (MCU). The sensor connector is electrically coupled to the MCU and configured to engage the cable assembly. The MCU is configured to determine a temperature based on the electrical parameter of the temperature sensing device. The MCU is further configured to generate temperature data representing the determined temperature. The MCU is further configured to transmit the temperature data to a sensor hub. The sensor hub is configured to transfer the temperature data to a display of a user interface. Engaging the cable assembly with the sensor connector causes the MCU to be electrically coupled to a battery, and disengaging the cable assembly from the sensor connector causes the MCU to be electrically decoupled from the battery.

In another aspect, a method for monitoring bearing temperatures on a machine is provided. The method is performed by a temperature monitoring system including a temperature sensing device having an electrical parameter that varies with temperature, a cable assembly electrically coupled to the temperature sensing device, and a sensor assembly including a sensor connector and a microcontroller unit (MCU). The sensor connector electrically is coupled to the MCU and configured to engage the cable assembly. The method includes determining, by the MCU, a temperature based on the electrical parameter of the temperature sensing device. Engagement of the cable assembly with the sensor connector causes the MCU to be electrically coupled to a battery. The method further includes generating, by the MCU, temperature data representing the determined temperature. The method further includes transmitting, by the MCU, the temperature data to a sensor hub. The sensor hub is configured to transfer the temperature data to a display of a user interface.

In another aspect, a temperature monitoring system for monitoring bearing temperatures on a machine is provided. The temperature monitoring system includes a temperature sensing device having an electrical parameter that varies with temperature. The temperature monitoring system further includes an accelerometer. The temperature monitoring system further includes a sensor assembly including a microcontroller unit (MCU) electrically coupled to the temperature sensing device and the accelerometer. The MCU is configured to determine a temperature based on the electrical parameter of the temperature sensing device. The MCU is further configured to generate temperature data representing the determined temperature. The MCU is further configured to detect acceleration in response to an acceleration signal output by the accelerometer. The MCU is further configured to, in a first active mode, periodically transmit the temperature data to a sensor hub at a first interval. The sensor hub is configured to transfer the temperature data to a display of a user interface. The MCU is further configured to, in response to determining a current temperature exceeds a threshold temperature, operate in a second active mode. The MCU is further configured to, in the second active mode, periodically transmit the temperature data to the sensor hub at a second interval. The second interval is shorter than the first interval. The MCU is further configured to, in response to not detecting acceleration, operate in a standby mode wherein the MCU does not transmit temperature data to the sensor hub.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 6 is an example user interface for use with the temperature monitoring system shown in FIG. 1.

Corresponding reference characters indicate corresponding parts throughout the drawings.

DETAILED DESCRIPTION

A temperature monitoring system for monitoring bearing temperatures on a machine, such as an agricultural implement, is provided according to embodiments of the present disclosure. The temperature monitoring system includes a temperature sensing device that is physically connected to a sensor assembly with a cable assembly, a sensor hub that is wirelessly connected to the sensor assembly, and a user interface that is connected to the sensor hub.

The temperature sensing device is positioned proximate to a bearing to detect a temperature of the bearing. This device can be a thermistor, a resistor whose resistance is dependent on its temperature, or a thermocouple, a device that generates a voltage that is dependent on its temperature, or any device that has an electrical parameter that varies with temperature.

The cable assembly connects the temperature sensing device to the sensor assembly and also provides a connection for components of the sensor assembly.

The sensor assembly includes a sensor connector, a battery, and a microcontroller unit (MCU). The sensor connector is electrically coupled to the MCU and configured to engage the cable assembly. The MCU is configured to determine a temperature based on the electrical parameter of the temperature sensing device, generate temperature data representing the determined temperature, and transmit sensor data including the temperature data along with a sensor identifier to a sensor hub with a radio signal.

The sensor hub is configured to receive the radio signal from the sensor assembly, or a plurality of sensor assemblies and to transfer the sensor data through a communication link to the user interface.

The user interface is configured to receive and store the sensor data, associate the sensor identifiers with a location on the machine, and to display the temperature data through a user display, enabling continuous or periodic monitoring of bearing temperatures and early detection of potential failure of the bearings.

Engaging the cable assembly with the sensor connector of the sensor assembly causes the MCU to be electrically coupled to the battery, and disengaging the cable assembly from the sensor connector causes the MCU to be electrically decoupled from the battery. Accordingly, because no power is drawn from the battery when the cable assembly is disengaged from the sensor assembly, a life of the battery may be extended.

In some embodiments, the MCU may be further coupled to an accelerometer, which enables the MCU to determine when the machine is operating. When the machine is not operating, the MCU may operate in a standby mode to reduce power consumption. In the standby mode, the MCU does not collect temperature data or transmit temperature data to the sensor hub. In certain embodiments, the rate at which the MCU transmits temperature data may be varied based on, for example, measured temperature, to further control power consumption, as described herein.

Figure 1:
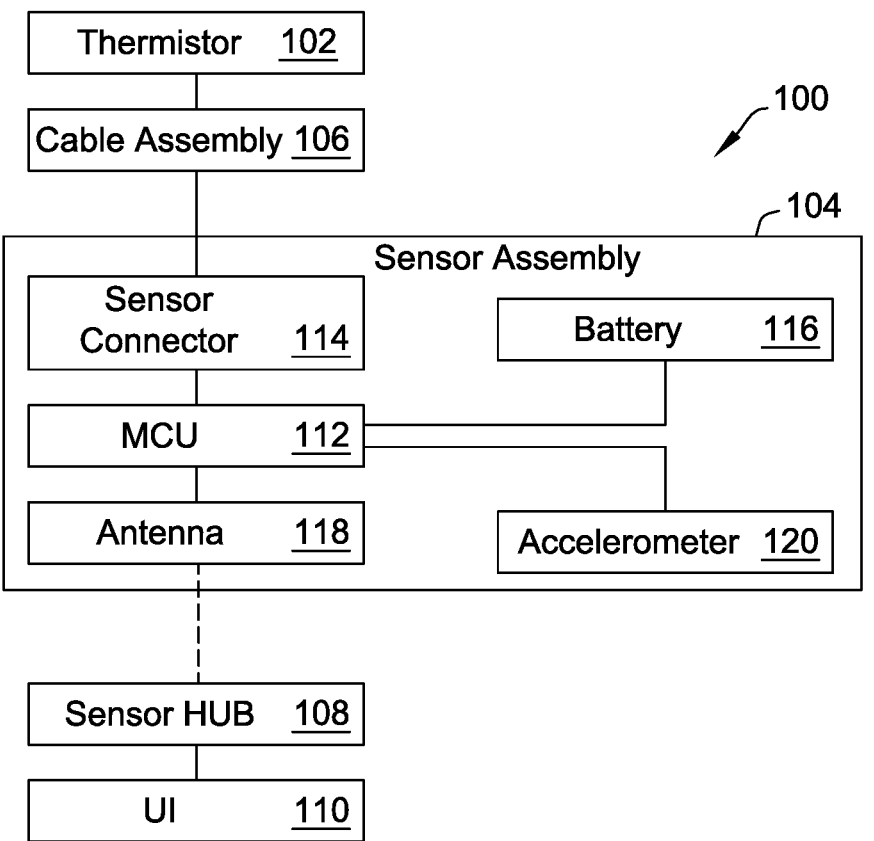
FIG. 1 is a block diagram of an example temperature monitoring system.

FIG. 1 is a block diagram of an example temperature monitoring system 100. Temperature monitoring system 100 includes a thermistor 102, a sensor assembly 104, a cable assembly 106, a sensor hub 108, and a user interface (UI) 110. Temperature monitoring system 100 may be installed on, and used to monitor the bearing temperatures of, an agricultural implement such as a baler or other machine.

Thermistor 102, with its electrical resistance that varies with temperature, when coupled to the sensor assembly, generates an electrical signal (sometimes referred to herein as a "temperature signal") that may be interpreted to determine a temperature at a location of thermistor 102. Thermistor 102 is positioned at a location within the machine to monitor a local temperature. For example, thermistor 102 is located proximate a bearing of a rotating portion of the machine in order to detect overheating of the bearing, so that the bearing may be serviced before an adverse outcome occurs.

Sensor assembly 104 includes an MCU 112 and a sensor connector 114. In some embodiments, sensor assembly 104 is implemented as a printed circuit board having MCU 112 and/or sensor connector 114 at least partially mounted thereon. Sensor assembly 104 may further include a housing and be mounted on or within the machine proximate to thermistor 102. MCU 112 is electrically coupled to sensor connector 114, which, as described in further detail below, is configured to be electrically coupled to thermistor 102 via cable assembly 106. Through this connection, MCU 112 is configured to connect to thermistor 102 and determine a temperature at the location of the thermistor based on the temperature signal. MCU 112 is further configured to generate temperature data representing the determined temperature and transmit the temperature data to sensor hub 108. In some embodiments, MCU 112 generates and/or transmits temperature data periodically and/or intermittently. As described in further detail below, the rate at which MCU 112 generates and/or transmits temperature data may vary depending on factors such as the measured temperature falling within a particular range and/or detection of activation of the machine.

Cable assembly 106 is electrically coupled to thermistor 102, and is configured to engage sensor connector 114. Cable assembly 106 includes a plurality of connector pins configured to be received by sensor connector 114. For example, cable assembly 106 may include first and second connector pins electrically coupled to thermistor 102, enabling an electrical connection between thermistor 102 and sensor assembly 104. In certain embodiments, cable assembly 106 is configured to mechanically attach to sensor connector 114. In some embodiments, cable assembly 106 is implemented as a jumper cable extending from thermistor 102 to sensor assembly 104. Accordingly, when installed, sensor assembly 104 is positioned remotely from thermistor 102.

Components of sensor assembly 104, such as MCU 112, are powered by a battery 116. In certain embodiments, battery 116 is disposed within a housing of sensor assembly 104 or otherwise incorporated into sensor assembly 104. Alternatively, battery 116 may be separate from sensor assembly 104. MCU 112 becomes coupled to battery 116 in response to cable assembly 106 engaging with sensor connector 114. For example, in some embodiments, cable assembly 106 further includes third and fourth connector pins electrically coupled to each other, and MCU 112 is configured to become electrically coupled to battery 116 based on an electrical connection between the third and fourth connector pins at sensor connector 114. Accordingly, engaging cable assembly 106 with sensor connector 114 causes MCU 112 to be electrically coupled to battery 116 and receive power. Similarly, disengaging cable assembly 106 from sensor connector 114 causes MCU 112 to be electrically decoupled from battery 116 and cease receiving power. As such, no power is drawn from battery 116 prior to installation of the cable assembly with the sensor assembly 104, which may prolong a life of battery 116. The battery life may be further prolonged by disengaging cable assembly 106 from sensor connector 114 during periods where the machine is not being used, such as during the off-season.

Sensor assembly 104 is configured for wireless communication with sensor hub 108. Sensor assembly 104 further includes an antenna 118, through which MCU 112 transmits temperature data to sensor hub 108. For example, MCU 112 may transmit a temperature measurement along with other information, such as an identifier corresponding to sensor assembly 104 (e.g., a serial number) and/or a current battery voltage of battery 116. Antenna 118 is incorporated into a radio module including components that enable MCU to communicate via antenna 118 using certain wireless communication protocols. For example, an electrical signal may be transmitted through antenna 118 according to a protocol such as a low-power wide-area network modulation technique (e.g., LoRa). In response to being powered on by being coupled to battery 116, MCU 112 is configured to enter a pairing mode to wirelessly pair with sensor hub 108. In the pairing mode, MCU 112 transmits a pairing flag using antenna 118, and sensor hub 108 is configured to pair with the sensor assembly 104 in response to receiving the pairing flag. The pairing flag includes an identifier corresponding to sensor assembly 104 (sometimes referred to herein as a "sensor assembly identifier,"), which may be associated with a specific location on the machine (sometimes referred to herein as a "machine location"). This pairing process prevents sensors that may be mounted on other nearby equipment or other on-board locations from interfering or providing misleading temperature information to UI 110.

Sensor hub 108 is connected to, and receives power from, an electrical system of the machine. Sensor hub 108 is also connected to the machine's control system, and transmits the temperature data along with the sensor assembly identifier to the machine's control system through a controller area network (CAN) connection. The machine's control system is programmed, through the pairing function, to associate the sensor assembly identifier with a machine location. In some embodiments, sensor hub 108 includes memory, and is capable of storing the association between the sensor assembly identifiers and corresponding machine locations, which may be communicated from the machine's control system. In some such embodiments, sensor hub 108 is capable of performing some data analytics, and storing some data (e.g., temperature data).

In certain embodiments, sensor hub 108 is further configured to communicate wirelessly, such as via Wi-fi or Bluetooth, with a hand-held device so that an operator that is not at the machine controls can access the temperature data and/or use the hand-held device during the pairing step to define the association between sensor assembly identifiers and machine locations. In some such embodiments, the CAN connection may not be present. For example, the machine may be configured to operate autonomously and may have a limited machine control system, so that the hand-held device is the primary way the temperature data is communicated to the operator. In such embodiments, the sensor hub may be configured to activate an alarm, such as a warning light on the machine, to alert the operator to access the temperature data with the hand-held device.

In certain embodiments, sensor assembly 104 further includes an accelerometer 120 electrically coupled to MCU 112. Alternatively, accelerometer 120 may be disposed external to sensor assembly 104 and in communication with MCU 112. Accelerometer 120 generates an electrical signal (sometimes referred to herein as an "acceleration signal") that is interpretable by MCU 112 to detect acceleration. In such embodiments, MCU 112 detects acceleration, which may be use or movement of the component where the bearing of interested is mounted, to determine that the machine is active and/or operating. To conserve power, MCU 112 operates in a standby mode when no acceleration is detected for a threshold period of time. For example, in some embodiments, if no acceleration is detected for one minute, MCU 112 begins operating in the standby mode. In the standby mode, MCU 112 does not transmit temperature data to the sensor hub, and may cease collecting temperature data. If acceleration is detected while MCU 112 is in the standby mode, MCU 112 ceases operating in the standby mode and resumes collecting and transmitting temperature data.

Figure 2:
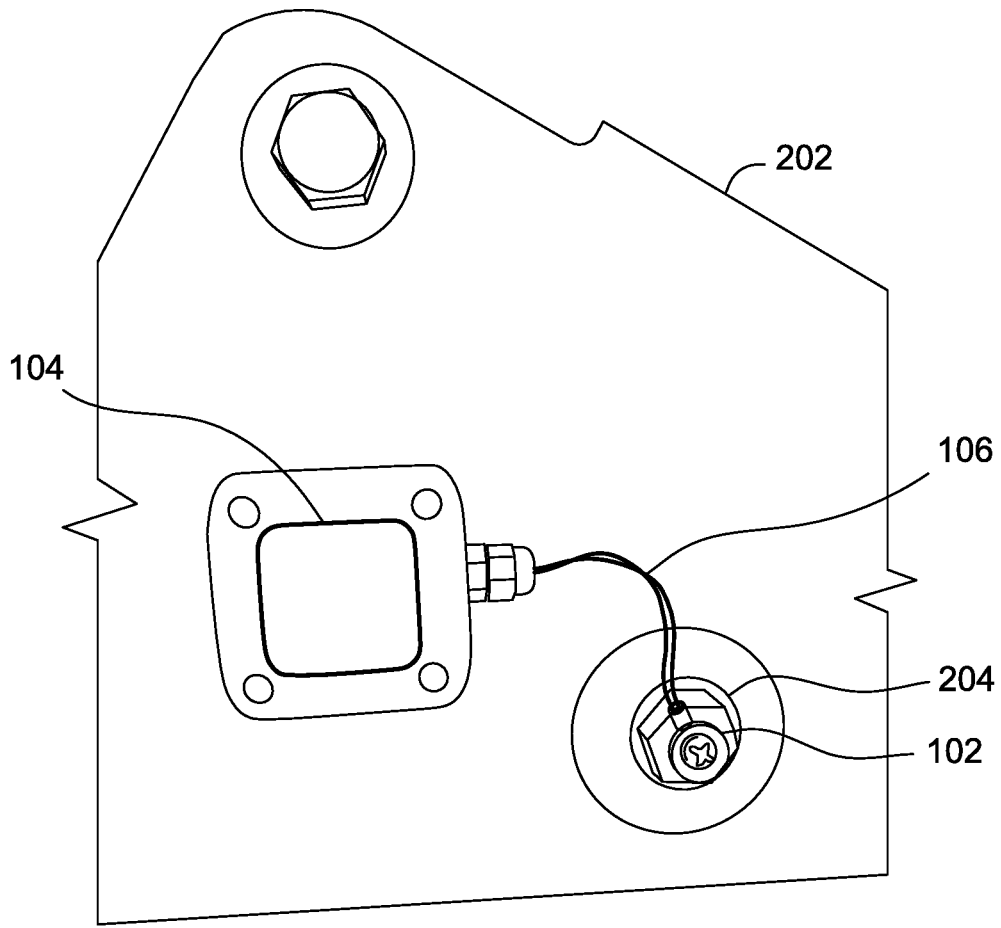
FIG. 2 is a perspective view of an example application of the temperature monitoring system shown in FIG. 1.

FIG. 2 depicts thermistor 102, sensor assembly 104, and cable assembly 106 installed on a machine 202. Machine 202 may be an agricultural implement such as, for example, a baler or forager. In the embodiment depicted in FIG. 2, thermistor 102 has a ring-lug configuration, and is mounted on a machine component 204, which may be, for example, a grease fitting, a roller bolt, or another bearing component. Accordingly, sensor assembly 104 is capable of determining a temperature of machine component 204. Sensor assembly 104 transmits this temperature data to sensor hub 108 (shown in FIG. 1), which may also receive temperature data from other sensor assemblies 104 with associated thermistors 102 disposed at other locations on machine 202.

Figure 3:
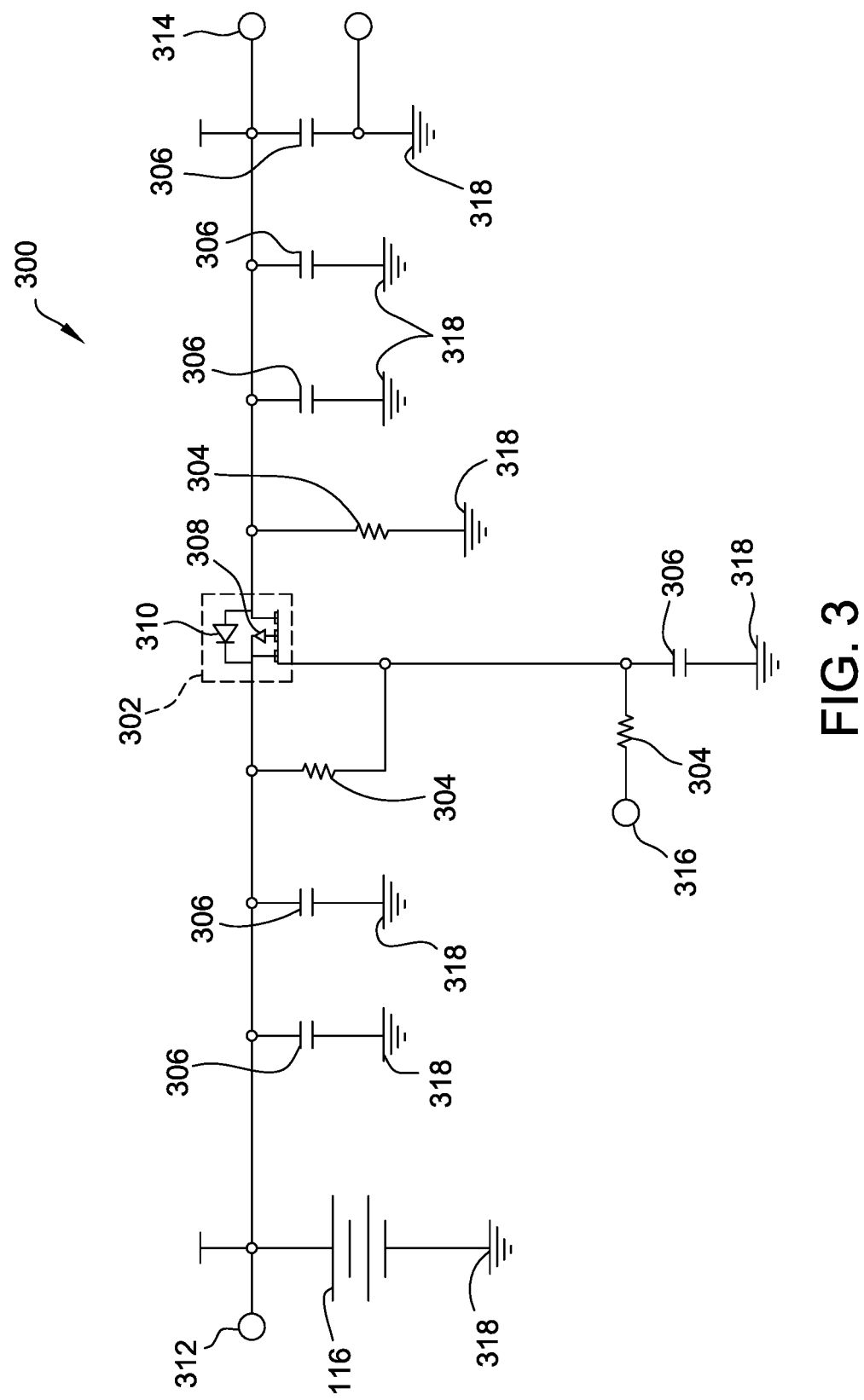
FIG. 3 is a circuit diagram of an example coupling detection circuit for use with the temperature monitoring system shown in FIG. 1.

FIG. 3 is a circuit diagram of an example coupling detection circuit 300 that may be used by sensor assembly 104 to detect when cable assembly 106 is engaged with sensor assembly 104 for the purposes of causing battery 116 to be electrically coupled to MCU 112. Coupling detection circuit 300 includes a transistor switch 302, a plurality of resistors 304, and a plurality of capacitors 306. In some embodiments, as shown in FIG. 3, transistor switch 302 includes a metal-oxide-semiconductor field effect transistor (MOSFET) 308 and a diode 310. Alternatively, transistor switch 302 may include one or more transistors of another type, a contactor, and/or other switching elements. Transistor switch 302 is electrically coupled between battery 116 at a battery node 312 and an output node 314. Output node 314 is in turn coupled to a power input of MCU 112 and/or other active components of sensor assembly 104. Accordingly, when transistor switch 302 is active, a direct current (DC) voltage of battery 116 powers MCU 112. An input node 316 is electrically coupled to the third connector pin of sensor connector 114, so that when sensor connector 114 is coupled to cable assembly 106, input node 316 is electrically connected to ground 318 via the third and fourth connector pins of sensor connector 114. Electrically connecting input node 316 to ground causes current flow through resistors 304, activating transistor switch 302 to couple battery 116 to MCU 112. Accordingly, coupling detection circuit 300 enables battery 116 to couple to MCU 112 in response to cable assembly 106 engaging sensor connector 114.

Figure 4:
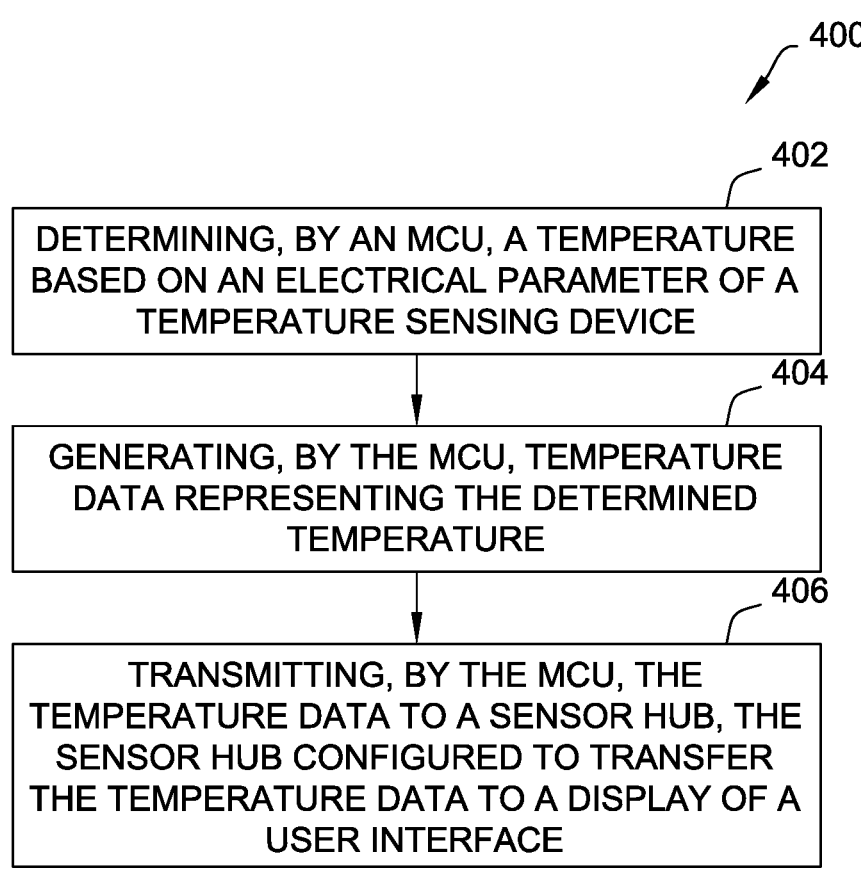
FIG. 4 is a flowchart of an example method for monitoring bearing temperatures on a machine.

FIG. 4 is a flowchart illustrating an example method 400 for monitoring bearing temperatures on a machine (such as machine 202). Method 400 may be performed by a temperature sensor system (such as temperature monitoring system 100) including a temperature sensing device (such as thermistor 102) having an electrical parameter that varies with temperature, a cable assembly (such as cable assembly 106) electrically coupled to the temperature sensing device, and a sensor assembly (such as sensor assembly 104) including a sensor connector (such as sensor connector 114) and an MCU (such as MCU 112). The sensor connector is electrically coupled to the MCU and configured to engage the cable assembly. In some embodiments, the sensor assembly further includes a battery (such as battery 116).

Method 400 includes determining 402, by the MCU, a temperature based on the electrical parameter of said temperature sensing device. Method 400 further includes generating 404, by the MCU, temperature data representing the determined temperature. Method 400 further includes transmitting 406, by the MCU, the temperature data to a sensor hub (such as sensor hub 108). The sensor hub is configured to transfer the temperature data to a display of a user interface (such as UI 110). In certain embodiments, the sensor hub is connected to the user interface via a CAN bus or a wireless connection. MCU electrically couples to the battery in response to the cable assembly engaging the sensor connector, and decouples from the battery in response to the cable assembly disengaging from the sensor connector.

In some embodiments, the cable assembly further includes a plurality of connector pins, and the sensor connector is configured to electrically couple to each connector pin of the plurality of connector pins when engaged with the cable assembly. In such embodiments, the plurality of connector pins includes a first connector pin and a second connector pin electrically coupled to the temperature sensing device, as well as a third connector pin and a fourth connector pin. The third connector pin is electrically coupled to the fourth connector pin, and the MCU is configured to electrically couple to the battery based on an electrical connection between the third connector pin and the fourth connector pin.

In certain embodiments, the sensor assembly further includes an antenna (such as antenna 118) electrically coupled to the MCU, and method 400 further includes wirelessly transmitting, by the MCU, the temperature data to the sensor hub using the antenna. In such embodiments, method 400 further includes, in response to the sensor assembly being coupled to the battery, initiating a pairing mode for establishing a wireless connection with the sensor hub, and, in the pairing mode, transmitting a pairing flag using the antenna. The sensor hub is configured to pair with the sensor assembly in response to receiving the pairing flag.

In some embodiments, the sensing assembly further includes an accelerometer electrically coupled to the MCU, and method 400 further includes detecting, by the MCU, acceleration in response to an acceleration signal output by the accelerometer. In such embodiments, method 400 further includes, in response to not detecting acceleration for a threshold period of time, operating in a standby mode in which the MCU does not transmit temperature data to the sensor hub, and, in response to detecting acceleration, ceasing operating in the standby mode.

Figure 5:
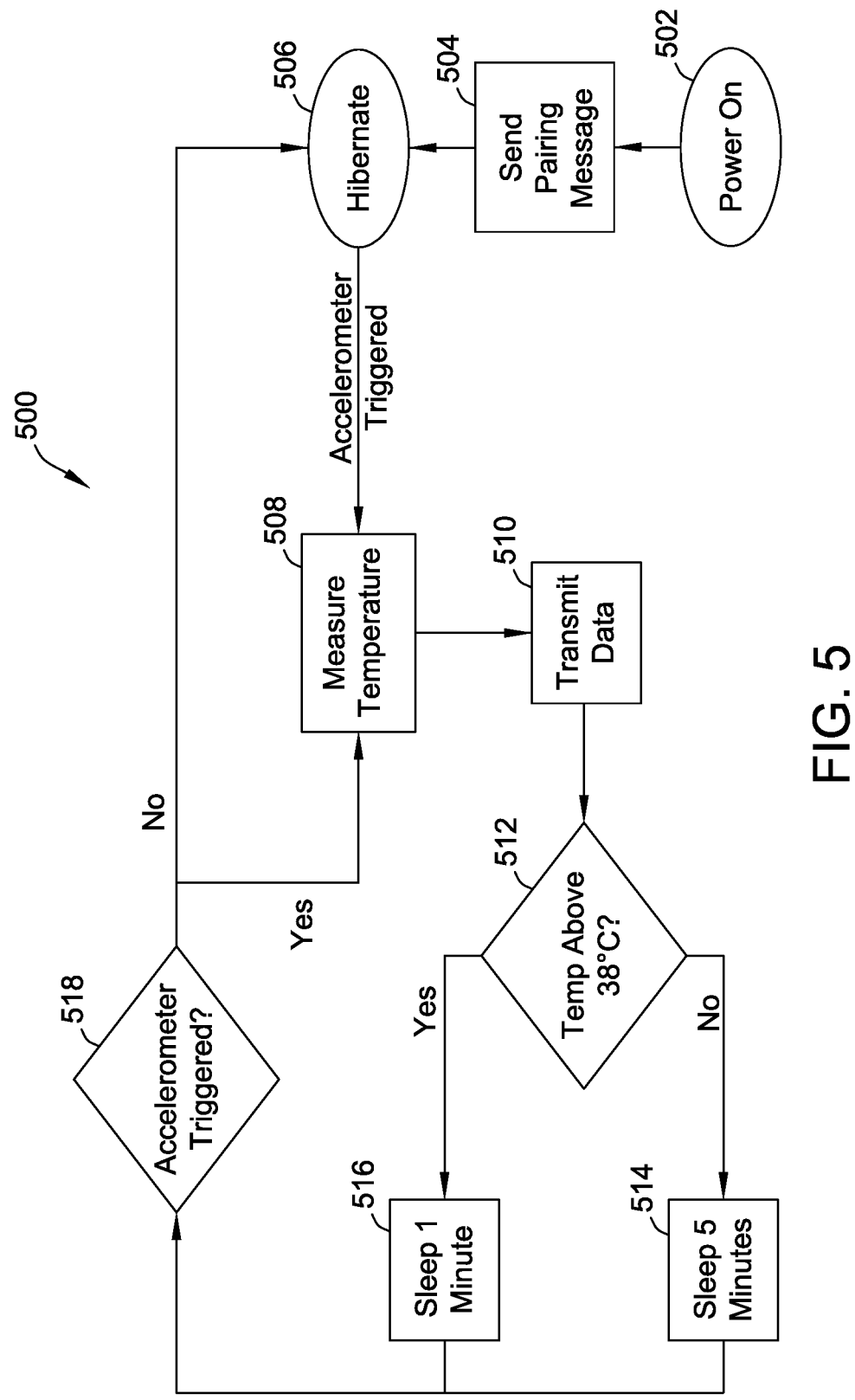
FIG. 5 is a flowchart of another example method for monitoring bearing temperatures on a machine.

FIG. 5 is a flowchart illustrating an example method 500 for monitoring bearing temperatures on a machine (such as machine 202). Method 500 may be performed using a temperature sensor system (such as temperature monitoring system 100) including a temperature sensing device (such as thermistor 102), an accelerometer (such as accelerometer 120), and a sensor assembly (such as sensor assembly 104) including an MCU (such as MCU 112) electrically coupled to the temperature sensing device and the accelerometer.

Method 500 includes powering on 502 the MCU, which as described above, is accomplished by electrically coupling a battery (such as battery 116) to the MCU in response to a cable assembly (such as cable assembly 106) engaging with a sensor connector (such as sensor connector 114) of the sensor assembly.

Method 500 further includes, in response to the MCU being powered, initiating a pairing mode for establishing a wireless connection with a sensor hub (such as sensor hub 108) and sending 504 a pairing message as part of the pairing mode. In some embodiments, in the pairing mode, the MCU transmits a pairing flag using an antenna (such as antenna 118). In such embodiments, the sensor hub is configured to pair with the sensor assembly in response to receiving the pairing flag.

Method 500 further includes, operating 506 in a standby mode (also referred to herein as hibernating) in which the MCU does not transmit temperature data to the sensor hub. The MCU may operate in the standby mode upon initial startup and/or in response to not detecting acceleration for a threshold period of time.

Method 500 further includes measuring 508 a temperature based on the electrical parameter of said temperature sensing device and generating temperature data representing the determined temperature.

Method 500 further includes transmitting 510 (e.g., periodically) the temperature data to the sensor hub. The sensor hub is configured to transfer the temperature data to a display of a user interface (such as UI 110).

Method 500 further includes comparing 512 the measured temperature to a threshold temperature. While FIG. 5 depicts 38 degrees Celsius as an example threshold temperature, any suitable threshold temperature may be used. Method 500 further includes operating 514 in a first active mode if a current temperature does not exceed the threshold temperature, and operating 516 in a second active mode if the current temperature does exceed the threshold temperature. In the first active mode, the MCU is inactive for a first interval, such as five minutes, before additional temperature data is transmitted to the sensor hub. In the second active mode, the MCU is inactive for a second interval, such as one minute, before additional temperature data is transmitted to the sensor hub. In some embodiments, the first interval is longer than the second interval to conserve power when temperatures are lower and less likely to be a cause for alert. Accordingly, when the temperature exceeds the threshold temperature, temperature data is transmitted to the sensor hub more frequently.

Method 500 further includes determining 518 whether acceleration is detected based on an acceleration signal output by the accelerometer. If no acceleration is detected, the MCU operates in the standby mode.

FIG. 6 is an example UI 600, which may be a portion of UI 110 displayed by, for example, a control system of a machine or a hand-held device in communication with sensor hub 108. UI 600 includes an ambient temperature indicator 602, which displays an ambient temperature at the machine. The ambient temperature may be measured using a temperature sensor incorporated into machine's control system and/or into sensor hub 108. UI 600 further includes a plurality of bearing temperature indicators 604, which display bearing temperatures of the machine. As described above, the bearing temperatures may be measured using temperature sensing devices such as thermistors 102 and transmitted to sensor hub 108 via sensor assemblies 104. In some embodiments, bearing temperature indicators 604 may include additional information, such as the machine location corresponding to each temperature.

Compared to conventional temperature monitoring systems, the embodiments of the present disclosure have several advantages. By regularly collecting temperature data, the temperature monitoring system described herein enables the detection of potential bearing failures early, so that appropriate preventative measures may be taken. By decoupling the battery from the MCU when the sensor assembly is decoupled from the cable assembly, the battery life may be extended, as no power is drawn from the battery during periods of non-use, such as prior to installation, when parked, or during an offseason. Further, by selectively collecting and/or transmitting temperature data in response to a detecting acceleration, the system may further reduce power consumption to extend the life of the battery.

The embodiments described herein involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A temperature monitoring system for monitoring bearing temperatures on a machine, said temperature monitoring system comprising:

a temperature sensing device having an electrical parameter that varies with temperature;

a cable assembly electrically coupled to said temperature sensing device; and a sensor assembly comprising a sensor connector and a microcontroller unit (MCU), said sensor connector electrically coupled to said MCU and configured to engage said cable assembly, said MCU configured to:

determine a temperature based on the electrical parameter of said temperature sensing device;

generate temperature data representing the determined temperature; and transmit the temperature data to a sensor hub, the sensor hub configured to transfer the temperature data to a display of a user interface, wherein engaging said cable assembly with said sensor connector causes said MCU to be electrically coupled to a battery, and wherein disengaging said cable assembly from said sensor connector causes said MCU to be electrically decoupled from the battery.

2. The temperature monitoring system of claim 1, wherein said sensor assembly comprises the battery.

3. The temperature monitoring system of claim 1, wherein said cable assembly further comprises a plurality of connector pins, and wherein said sensor connector is configured to electrically couple to each connector pin of the plurality of connector pins when engaged with said cable assembly.

4. The temperature monitoring system of claim 3, wherein said plurality of connector pins comprises a first connector pin and a second connector pin, said first connector pin and said second connector pin electrically coupled to said temperature sensing device.

5. The temperature monitoring system of claim 4, wherein said plurality of connector pins further comprises a third connector pin and a fourth connector pin, said third connector pin electrically coupled to said fourth connector pin, wherein said MCU is configured to electrically couple to the battery based on an electrical connection between said third connector pin and said fourth connector pin.

6. The temperature monitoring system of claim 1, wherein said sensor assembly further comprises an antenna electrically coupled to said MCU, and wherein said MCU is further configured to wirelessly transmit the temperature data to the sensor hub using said antenna.

7. The temperature monitoring system of claim 6, wherein said MCU is further configured to:

in response to said sensor assembly being coupled to the battery, initiate a pairing mode for establishing a wireless connection with the sensor hub; and in the pairing mode, transmit a pairing flag using said antenna, wherein the sensor hub is configured to pair with said sensor assembly in response to receiving the pairing flag.

8. The temperature monitoring system as in of claim 1, wherein said sensing assembly further comprises an accelerometer electrically coupled to said MCU, and wherein said MCU is further configured to:

detect acceleration in response to an acceleration signal output by said accelerometer;

in response to not detecting acceleration for a threshold period of time, operate in a standby mode in which said MCU does not transmit temperature data to the sensor hub; and in response to detecting acceleration, cease operating in the standby mode.

9. The temperature monitoring system as of claim 1, wherein said temperature sensing device comprises a thermistor.

10. A method for monitoring bearing temperatures on a machine, said method performed by a temperature monitoring system including a temperature sensing device having an electrical parameter that varies with temperature, a cable assembly electrically coupled to the temperature sensing device, and a sensor assembly including a sensor connector and a microcontroller unit (MCU), the sensor connector electrically coupled to the MCU and configured to engage the cable assembly, said method comprising:

determining, by the MCU, a temperature based on the electrical parameter of the temperature sensing device, wherein engagement of the cable assembly with the sensor connector causes the MCU to be electrically coupled to a battery;

generating, by the MCU, temperature data representing the determined temperature; and transmitting, by the MCU, the temperature data to a sensor hub, the sensor hub configured to transfer the temperature data to a display of a user interface.

11. The method of claim 10, further comprising:

in a first active mode, periodically transmitting, by the MCU, the temperature data to the sensor hub at a first interval; and in a second active mode, periodically transmitting, by the MCU, the temperature data to the sensor hub at a second interval.

12. The method of claim 11, wherein the second interval is shorter than the first interval.

13. The method of claim 11, further comprising, in response to determining a current temperature exceeds a threshold temperature, operating the MCU in the second active mode.

14. The method of claim 10, wherein the sensor assembly further includes an antenna electrically coupled to the MCU, and said method further comprises wirelessly transmitting, by the MCU, the temperature data to the sensor hub using the antenna.

15. The method of claim 14, further comprising:

in response to the sensor assembly being coupled to the battery, initiating, by the MCU, a pairing mode for establishing a wireless connection with the sensor hub; and in the pairing mode, transmitting, by the MCU, a pairing flag using the antenna, wherein the sensor hub is configured to pair with the sensor assembly in response to receiving the pairing flag.

16. The method of claim 10, wherein the sensing assembly further includes an accelerometer electrically coupled to the MCU, and wherein said method further comprises:

detecting, by the MCU, acceleration in response to an acceleration signal output by the accelerometer;

in response to not detecting acceleration for a threshold period of time, operating, by the MCU, in a standby mode in which the MCU does not transmit temperature data to the sensor hub; and in response to detecting acceleration, ceasing operating, by the MCU, in the standby mode.

17. A temperature monitoring system for monitoring bearing temperatures on a machine, said temperature monitoring system comprising:

a temperature sensing device having an electrical parameter that varies with temperature;

an accelerometer; and a sensor assembly comprising a microcontroller unit (MCU) electrically coupled to said temperature sensing device and said accelerometer, said MCU configured to:

determine a temperature based on the electrical parameter of said temperature sensing device;

generate temperature data representing the determined temperature;

detect acceleration in response to an acceleration signal output by said accelerometer;

in a first active mode, periodically transmit the temperature data to a sensor hub at a first interval, the sensor hub configured to transfer the temperature data to a display of a user interface;

in response to determining a current temperature exceeds a threshold temperature, operate in a second active mode;

in the second active mode, periodically transmit the temperature data to the sensor hub at a second interval, the second interval shorter than the first interval; and in response to not detecting acceleration, operate in a standby mode wherein said MCU does not transmit temperature data to the sensor hub.

18. The temperature monitoring system of claim 17, further comprising a cable assembly electrically coupled to said temperature sensing device, wherein said sensor assembly further comprises a sensor connector configured to engage with said cable assembly.

19. The temperature monitoring system of claim 18, wherein engaging said cable assembly with said sensor connector causes said MCU to be electrically coupled to a battery, and wherein disengaging said cable assembly from said sensor connector causes said MCU to be electrically decoupled from the battery.

20. The temperature monitoring system of claim 19, wherein said sensor assembly comprises the battery.

* * * * *